US012689153B2

(12) United States Patent
Nunez

(10) Patent No.: US 12,689,153 B2
(45) Date of Patent: Jul. 21, 2026

(54) CABLE STRAIN RELIEF APPARATUS AND ASSOCIATED CABLE ASSEMBLY

(71) Applicant: UBICQUIA, INC., Fort Lauderdale, FL (US)

(72) Inventor: Cesar Eduardo Nunez, Miramar, FL (US)

( * ) Notice: Subject to any disclaimer, the term of this patent is extended or adjusted under 35 U.S.C. 154(b) by 259 days.

(21) Appl. No.: 18/372,054

(22) Filed: Sep. 22, 2023

(65) Prior Publication Data

US 2024/0106162 A1 Mar. 28, 2024

Related U.S. Application Data

(60) Provisional application No. 63/408,930, filed on Sep. 22, 2022.

(51) Int. Cl.
*H01R 13/58* (2006.01)

(52) U.S. Cl.
CPC ..... *H01R 13/5845* (2013.01); *H01R 13/5825* (2013.01); *H01R 2201/02* (2013.01); *H01R 2201/24* (2013.01)

(58) Field of Classification Search
CPC ............ H01R 13/5845; H01R 13/5825; H01R 2201/02; H01R 2201/24; H01R 13/506; H01R 13/582
See application file for complete search history.

(56) References Cited

U.S. PATENT DOCUMENTS 3,743,748 A * 7/1973 Reeder ................ H01R 9/0515 439/55
4,804,338 A * 2/1989 Dibble .................... H01R 4/72 29/859
2017/0214191 A1* 7/2017 Lane .................... H01R 13/426
2022/0216581 A1* 7/2022 Epitaux .................. H01P 5/087

* cited by examiner

*Primary Examiner* — Edwin A. Leon
(74) *Attorney, Agent, or Firm* — Daniel C. Crilly

(57) ABSTRACT

A cable strain relief apparatus for a cable attached to a connector includes at least one multi-section member. The member includes a first section configured to partially surround a portion of the connector and a second section aligned with the first section along a central longitudinal axis and configured to partially surround a portion of the cable. Where the apparatus includes two members, each member may include similar first and second sections, but one member may include a protrusion extending from an exposed face of a wall of the member's second section and the other member may include a protrusion receptacle integrated into an exposed face of a wall of such member's second section, wherein when the two members are joined together, the protrusion mates with the protrusion receptacle. A binder may be optionally included to secure the member to the cable or to retain the mated members together.

20 Claims, 9 Drawing Sheets

CABLE STRAIN RELIEF APPARATUS AND ASSOCIATED CABLE ASSEMBLY

CROSS-REFERENCE TO RELATED APPLICATIONS

The present application claims the benefit of and priority upon U.S. Provisional Patent Application No. 63/408,930, which was filed on Sep. 22, 2022, and is incorporated herein by this reference as if fully set forth herein.

TECHNICAL FIELD

The present disclosure relates generally to cable-connector interfaces and, more particularly, to a strain relief apparatus that secures around a portion of a cable and a portion of the cable's attached connector to prevent undesirable bending or flexing of the cable at the point, junction, or interface where the cable attaches to the connector.

BACKGROUND

Coaxial cables are in widespread use and are common for carrying a variety of electromagnetic signals, including radio frequency signals. Typically, a coaxial cable is terminated with a connector that can be connected to a corresponding connector mount, or simply a "mount." In many coaxial cable applications, the termination of the cable where it is joined to a connector is covered in order to protect the physical joinery (e.g., solder joint) from damage that can be caused by bending resulting from strain on the cable when the cable is pulled at an angle to the connector axis. This can break the connection between the cable and the connector or create electrical intermittencies that affect the signal and introduce noise. Accordingly, it is common to provide strain relief at the termination of the cable where it connects to the connector. A common form of strain relief is to simply add a layer of material around the cable and a portion of the connector, such as heat shrink tubing. This usually resists bending enough to prevent damage to the connection between the cable and the connector. However, while at lower radio frequencies, bends and the routing of a coaxial cable are of little consequence, electrically, at higher frequencies, such as those used for so called 5G cellular radio interface, which operate in the range of 24-54 GHz, the position of a cable can affect the signal performance, and possibly result in undesired effects, such as intermodulation products. In systems manufactured for use at such frequencies, it is important that the cabling be consistent from unit to unit, and existing strain relief approaches are insufficient to provide the necessary consistency as well as the ease of assembly needed for manufacturing.

SUMMARY

In accordance with some embodiments, there is provided a cable strain relief apparatus that includes two or more interfacing members configured to surround a terminal portion of a cable and a portion of a connector that is connected to the cable at the terminal portion. The apparatus can further include each of the plurality of interfacing members having a wall that is configured to partially surround the terminal portion of the cable and the portion of the connector. The wall defines a channel along the interfacing member configured to receive the terminal portion of the cable and the portion of the connector therein. The apparatus further includes each of the plurality of interfacing members having a protrusion that extends from the wall and a negative space on an opposite side of the channel from the protrusion that extends into the wall and is identically shaped to the protrusion. The protrusion of a first one of plurality of interfacing members nests into the negative space of a second one of plurality of interfacing members. The apparatus further includes a binder configured to extend around the plurality of interface members to hold them together around the terminal portion of the cable and the portion of the connector.

In accordance with some embodiments, the cable strain relief apparatus includes a pair of identical cable strain relief members consisting of a first member and a second member. Each one of the first and second members having a wall that is configured to partially surround a terminal portion of a cable and the portion of a connector to which the cable is connected. The wall defines a channel along the cable strain relief member from a first end to a second end and is configured to receive the terminal portion of the cable and a portion of the connector therein. The wall further defines a first face and a second face, wherein the first face and second face are coplanar faces on opposite sides of an axis along the channel from the first end to the second end. The apparatus can further include a protrusion that extends from the first face and a groove in the second face that extends into the second face and is identically shaped to the protrusion. The apparatus can further include a trough formed in a terminal portion adjacent the second end, wherein the trough is semi-annular about the axis. The protrusion of the first member fits into the groove of the second member, and the protrusion of the second member fits into the groove of the first member when the first and second members are interfaced together. Each of the first and second members have a semi-annular trough at a terminal portion that is adjacent to the second end. According to one exemplary embodiment, the strain relief apparatus is adapted to prevent strain in coaxial cables or cable-connector solder joints for coaxial cables used to connect radio frequency or microwave radio modules to their antennas, where strain in the cable or cable-connector solder joints can cause or exacerbate passive intermodulation or other types of intermodulation distortion of the radio signal being transmitted through the cable to the antenna.

According to one or more alternative embodiments, a cable strain relief apparatus includes at least two elongated curved members. A first member includes a first section sized and shaped to partially surround a portion of a cable connector, a second section sized and shaped to partially surround a portion of a cable to which the cable connector is attached, and a protrusion extending from a widthwise end of the first member. A second elongated curved member includes a first section sized and shaped to partially surround the cable connector portion, a second section sized and shaped to partially surround the cable portion, and a widthwise end defining a protrusion receptacle. When the first member and the second member are mated together, the first section of the first member and the first section of the second member define a first compartment sized and shaped to snugly surround the cable connector portion, the second section of the first member and the second section of the second member define a second compartment sized and shaped to snugly surround the cable portion, and the protrusion mates with the protrusion receptacle. According to one embodiment, each member may be sized and shaped to surround one-half of the connector portion and the cable portion. Alternatively, one member may be sized and shaped to surround less than one-half of the connector portion and the cable portion, and the other member may be sized and shaped to surround more than one-half of the connector portion and the cable portion. In a further embodiment, one member may be sized and shaped to surround less than one-half of the connector portion and more than one-half of the cable portion, or vice versa, and the other member may be sized and shaped to surround more than one-half of the connector portion and less than one-half of the cable portion, or vice versa.

In an alternative embodiment, the first member of the cable strain relief apparatus may further include a second widthwise end defining a second protrusion receptacle and the second member of the cable strain relief apparatus may further include a second protrusion extending from a second widthwise end of the second member. In such a case, when the two members are mated together, the second protrusion mates with the second protrusion receptacle. In this particular embodiment, the two members may be substantially identical, with each being sized and shaped to surround one-half of the connector portion and the cable portion. Alternatively, the two members be different, with one member being sized and shaped to surround less than one-half of the connector portion and the cable portion and the other member being sized and shaped to surround more than one-half of the connector portion and the cable portion. In a further alternative embodiment, one member may be sized and shaped to surround less than one-half of the connector portion and more than one-half of the cable portion, or vice versa, and the other member may be sized and shaped to surround more than one-half of the connector portion and less than one-half of the cable portion, or vice versa.

In a further alternative embodiment, the cable strain relief apparatus may also include a binder sized and shaped to surround and retain the first member and the second member when the two members are mated together. The binder may be heat shrunk tubing or any other binding materials, including cable ties, straps, and miniature clamps.

In accordance with some embodiments, a cable assembly includes a coaxial cable having a termination and a connector that is coupled to the coaxial cable at the termination. The connector has an annual shoulder at an end of the connector adjacent to the termination of the coaxial cable. The connector also has a shank adjacent to the annular shoulder opposite the annular shoulder from the termination of the coaxial cable. A sheath member is disposed over the termination of the coaxial cable where the coaxial cable is connected to the connector. The assembly further includes a pair of cable strain relief members disposed around the coaxial cable, in an interfacing manner, and which together cover the termination of the coaxial cable, the sheath member, and the annular shoulder and shank of the connector. The annular shoulder of the connector is captured in a corresponding trough in each of the cable strain relief members. The coaxial cable passes through a bore formed between the pair of cable strain relief members along an axis. The assembly further includes a binder disposed around an outside of the pair of cable strain relief members that holds the pair of cable strain relief members together.

In an alternative embodiment, a cable assembly includes a coaxial cable, a connector, attached to an end of the coaxial cable, and a cable strain relief apparatus positioned snugly around at least a portion of the connector and a portion of the coaxial cable. The cable strain relief apparatus includes at least two elongated curved members mated together to encase at least the cable connector portion and the coaxial cable portion. A first elongated curved member includes a first section sized and shaped to receive and partially surround the connector portion, a second section sized and shaped to receive and partially surround the coaxial cable portion, and a widthwise end defining a protrusion receptacle. A second elongated curved member is mated with the first member and includes a first section sized and shaped to receive and partially surround the connector portion, a second section sized and shaped to receive and partially surround the coaxial cable portion, and a protrusion extending from a widthwise end thereof and into the protrusion receptacle. As mated together, the first section of the first member and the first section of the second member snugly surround the connector portion and the second section of the first member and the second section of the second member snugly surround the coaxial cable portion. In an alternative embodiment, the second member of the cable strain relief apparatus further includes a second widthwise end defining a second protrusion receptacle and the first member of the cable strain relief apparatus further includes a second protrusion extending from a second widthwise end thereof into the second protrusion receptacle.

In a further alternative embodiment, the cable assembly may also include a binder sized and shaped to surround and retain the first member and the second member in a mated relationship. The binder may be heat shrunk tubing or any other binding materials, including cable ties, straps, and miniature clamps. Either protrusion may be partially cylindrical tongue and the complementary protrusion receptacle may be a partially cylindrical groove. Alternatively, either protrusion may be a peg, a set of pegs, or the like and the complementary protrusion receptacle may be a bore or hole, a set of bores or holes, or the like.

According to one exemplary embodiment, a cable strain relief apparatus includes at least a first section sized and shaped to partially surround a portion of a cable connector (e.g., a coaxial cable connector) and a second section aligned with the first section along a central longitudinal axis, wherein the second section is sized and shaped to partially surround a portion of a cable (e.g., a coaxial cable) to which the cable connector is attached. In such an embodiment, the first and second sections may be rigid to prevent or at least mitigate bending or pinching in the area where the connector is attached (e.g., soldered, crimped, or otherwise secured) to the cable. The first and second sections may also be non-conductive to reduce cost and minimize any electrical effects of the cable strain relief apparatus on the performance of a cable assembly that includes the connector, the cable, and the cable strain relief apparatus. The first and second sections may be fabricated as a single, injection molded component or may be fabricated as separate components. The cable strain relief apparatus may also include a binder, such as tape, adhesive, or heat shrink tubing, sized and shaped to surround and secure the first section and the second section to the cable.

According to an alternative exemplary embodiment, a cable strain relief apparatus includes a pair of mated elongated members. A first member of the pair includes a first section sized and shaped to partially surround a portion of a cable connector, a second section sized and shaped to partially surround a portion of a cable to which the cable connector is attached, and a protrusion extending from an exposed face of a wall of the second section of the first member. The two sections of the first member are aligned along a central longitudinal axis.

The second member of the pair includes a first section sized and shaped to partially surround the portion of the cable connector, a second section sized and shaped to partially surround the portion of the cable to which the cable connector is attached, and a protrusion receptacle integrated into at least an exposed face of a wall of the second section of the second member. When the first member and the second member are mated together, the first section of the first member and the first section of the second member define a first compartment sized and shaped to snugly surround the portion of the cable connector, the second section of the first member and the second section of the second member define a second compartment sized and shaped to snugly surround the portion of the cable to which the cable connector is attached, and the protrusion of the first member mates with the protrusion receptacle of the second member.

According to another alternative embodiment, each member of the multi-member cable strain relief apparatus may be curved and include both a protrusion extending from one exposed face of its wall and a protrusion receptacle integrated into the opposite exposed face of its wall such that when the two members are mated together, each member's protrusion mates with the other member's protrusion receptacle. According to one exemplary embodiment, the two members of the apparatus may be identical or substantially identical such that when one member is placed atop the other with the cable connector portion and the cable portion in between, the two members mate together and surround the portion of the cable connector and the portion of the cable for which the members were sized and shaped (e.g., configured). According to another exemplary embodiment, each member of the multi-member cable strain relief apparatus may be a single molded component.

According to a further exemplary embodiment, the wall of the second section of a particular member may be common to the member entirely (especially where the member is a single molded component) and a width of an inside surface of the wall may vary between the first section of the member and the second section of the member. For example, the width or inner diameter of the wall may be greater in the first section (e.g., to accommodate the cable connector portion) than it is in the second section (e.g., to accommodate the cable).

In another exemplary embodiment, the protrusion of the first member of the cable strain relief apparatus may be a partially cylindrical tongue. In such a case, the protrusion receptacle of the second member of the cable strain relief apparatus may be a complementary, partially cylindrical groove.

In a further exemplary embodiment, the cable strain relief apparatus may also include a binder sized and shaped to surround and retain the first member and the second member in a mated relationship when the first member and the second member are mated together. The binder may be or include heat shrink tubing that has been shrunk around all or part of the apparatus members. Alternatively, the binder may be or include tape (e.g., electrical tape), liquid adhesive, or a clamp. The binder may also overlap the members of the strain relief apparatus and the cable for which relief is being provided by the strain relief apparatus.

According to a further exemplary embodiment, a cable assembly includes a cable, a connector attached to a first portion (e.g., a terminal portion) of the cable, and a cable strain relief apparatus providing strain relief at the first portion of the cable. The cable strain relief apparatus may be the single member or multi-member apparatus described above. The cable may be a coaxial cable or other signal-carrying cable. In one exemplary embodiment, the cable strain relief apparatus of the cable assembly is a multi-member apparatus that includes a pair of elongated members, which mate together to snugly surround a portion of the connector and a second portion of the cable. The second portion of the cable may be adjacent or proximate to the first portion of the cable.

In this exemplary embodiment, the first member may include a first section sized and shaped to receive and partially surround the portion of the connector, a second section sized and shaped to receive and partially surround the second portion of the cable, and a protrusion extending from an exposed face of a wall of the second section of the first member. The second member may include a first section sized and shaped to receive and partially surround the portion of the connector, a second section sized and shaped to receive and partially surround the second portion of the cable, and a protrusion receptacle integrated into an exposed face of a wall of the second section of the second member. In this case, the protrusion of the first member mates with the protrusion receptacle of the second member, the first section of the first member and the first section of the second member snugly surround the portion of the connector, and the second section of the first member and the second section of the second member snugly surround the second portion of the cable. In one exemplary embodiment, the protrusion of the first member of the cable strain relief apparatus may be a partially cylindrical tongue. In such a case, the protrusion receptacle of the second member of the cable strain relief apparatus may be a complementary, partially cylindrical groove.

In various alternative embodiments of the cable assembly, the members of the cable strain relief apparatus may be curved and include both a protrusion extending from one exposed face of its wall and a protrusion receptacle integrated into the opposite exposed face of its wall such that when the two members are mated together, each member's protrusion mates with the other member's protrusion receptacle. According to one exemplary embodiment, the two members of the cable strain relief apparatus may be identical or substantially identical such that when one member is placed atop the other with the connector portion and the cable portion in between, the two members mate together and surround the portion of the connector and the portion of the cable for which the members were sized and shaped (e.g., configured).

In a further exemplary embodiment, the cable assembly may also include a binder sized and shaped to surround and retain the first member and the second member of the cable strain relief apparatus in a mated relationship. The binder may be or include, for example, heat shrunk tubing, tape, adhesive, or a clamp.

Although the present disclosure illustrates and describes various embodiments of a cable strain relief apparatus and associated cable assembly, the disclosure is not intended to be limited to the details shown because various modifications and structural changes may be made therein without departing from the spirit of the disclosure and while remaining within the scope and range of equivalents of the appended claims. Additionally, well-known elements of the invention will not be described in detail or will be omitted so as not to obscure the relevant details of the apparatus and assembly.

Features that are considered characteristic of the invention are set forth in the appended claims. Detailed embodiments of cable strain relief apparatus and cable assemblies are disclosed herein; however, it is to be understood that the disclosed embodiments are merely exemplary, and the cable strain relief apparatus and the cable assembly may be embodied in various forms. Therefore, specific structural and functional details disclosed herein are not to be interpreted as limiting, but merely as a basis for the claims and as a representative basis for teaching one of ordinary skill in the art to variously employ the claimed invention in appropriately detailed structures. Further, the terms and phrases used herein are not intended to be limiting; but rather, to provide an understandable description of the disclosure. While the specification concludes with claims defining the features of the invention, it is believed that the claimed invention will be better understood from a consideration of the following description in conjunction with the drawing figures, in which like reference numerals are carried forward. The figures of the drawings are not drawn to scale.

The terminology used herein is for the purpose of describing particular embodiments only and is not intended to be limiting. The terms "a" or "an," as used herein, are defined as one or more. The term "plurality," as used herein, is defined as two or more. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense (e.g., bringing/coming into physical existence, making available, and/or supplying to someone or something, in whole or in multiple parts at once or over a period of time).

As used in this description, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present disclosure and simplify the description, but not to indicate or imply that the devices or components must have a specific azimuth, or be constructed or operated in the specific azimuth, which thus cannot be understood as a limitation to the embodiments of the present disclosure. Furthermore, terms such as "first", "second", "third" and so on are used in the present disclosure and appended claims only to distinguish one element or item from another and not to indicate or imply order or relative importance.

As used in this description, unless otherwise clearly defined and limited, terms such as "installed," "coupled," "connected," "mated," and "joined" should be broadly interpreted. For example, such terms may disclose or imply fixed connection, detachable connection, integral connection, mechanical connection, electrical connection; direct connection, or indirect connection (such as via one or more intermediate elements, media, or connections). As used herein, the terms "about" "approximately" apply to all numeric values, whether or not explicitly indicated. These terms generally refer to a range of numbers that one of skill in the art would consider equivalent to the recited values (e.g., having the same function or result). In many instances these terms may include numbers that are rounded to the nearest significant figure. In this document, the term "longitudinal" or "lengthwise" should be understood to mean in a direction corresponding to an elongated direction of an element, member, component, item, or apparatus. In this document, the term "widthwise" should be understood to mean in a direction orthogonal to the elongated direction of an element, member, component, item, or apparatus. Those skilled in the art can understand the specific meanings of the above-mentioned terms in the embodiments of the present disclosure according to the exemplary circumstances or context provided herein.

In the absence of any specific clarification related to its express use in a particular context, where the term "substantially" in any grammatical form is used as a modifier in the present disclosure and any appended claims (e.g., to modify a structure, a dimension, a measurement, or some other characteristic), it is understood that the characteristic may vary by up to 30 percent. For example, an element or characteristic thereof may be described as being "substantially identical" to another element or characteristic. In such a case, the two elements or characteristics may be identical or vary to within 30 percent of their respective dimensions.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present disclosure.

DETAILED DESCRIPTION

Figure 1A:
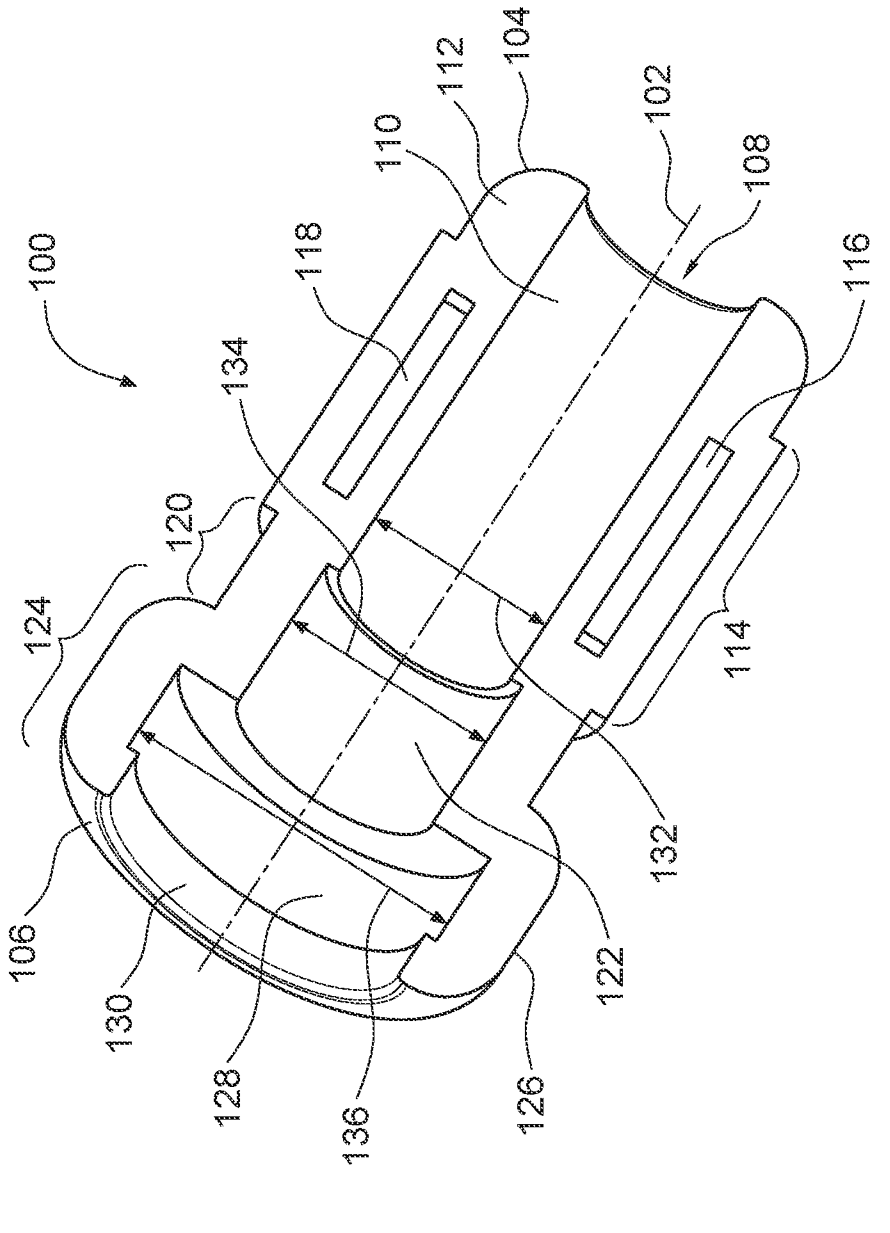
FIG. 1A is a perspective view of an exemplary cable strain relief member, which forms part of a multi-member cable strain relief apparatus, in accordance with some exemplary embodiments of the present disclosure.
Figure 1B:
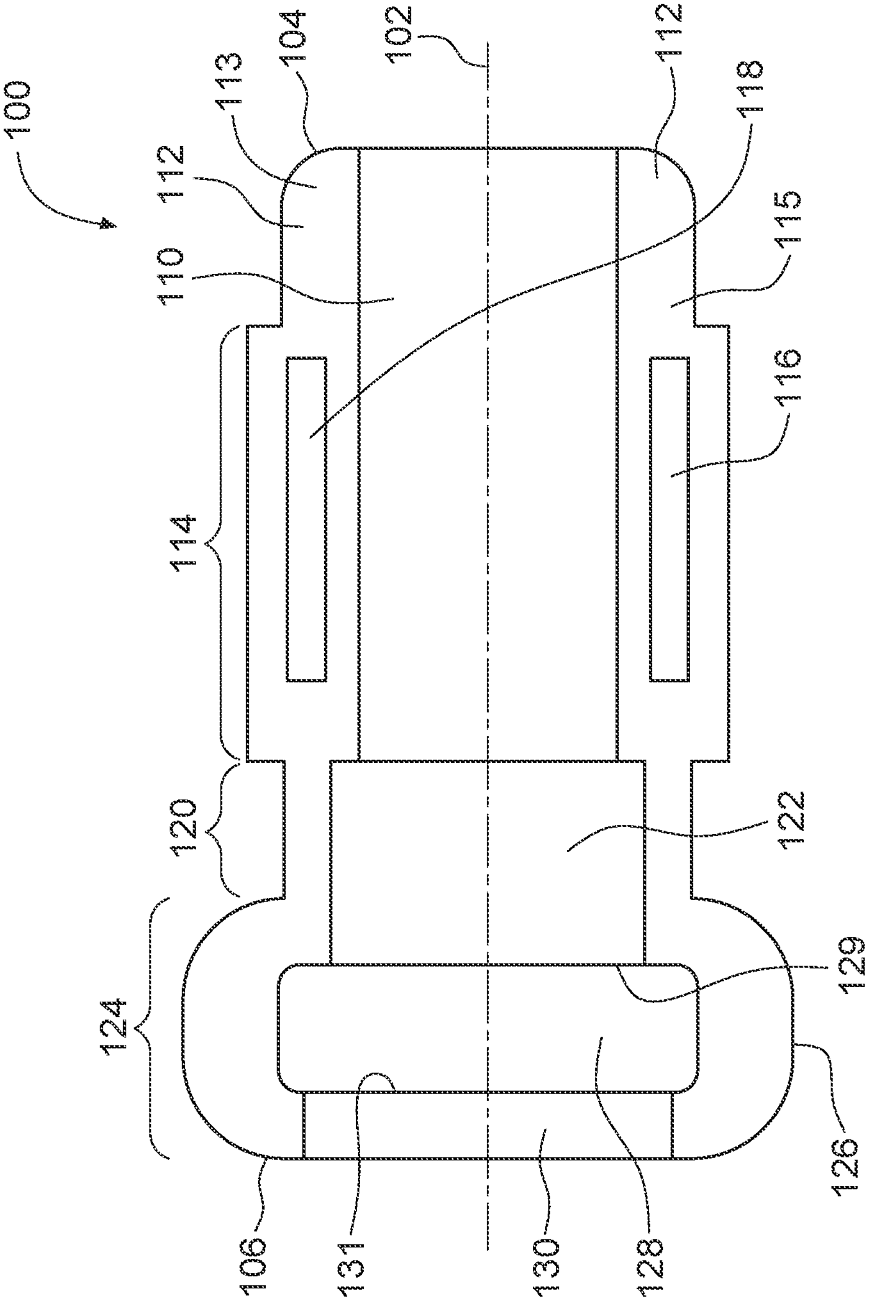
FIG. 1B is a top plan view of the exemplary cable strain relief member of FIG. 1A.
Figure 5:
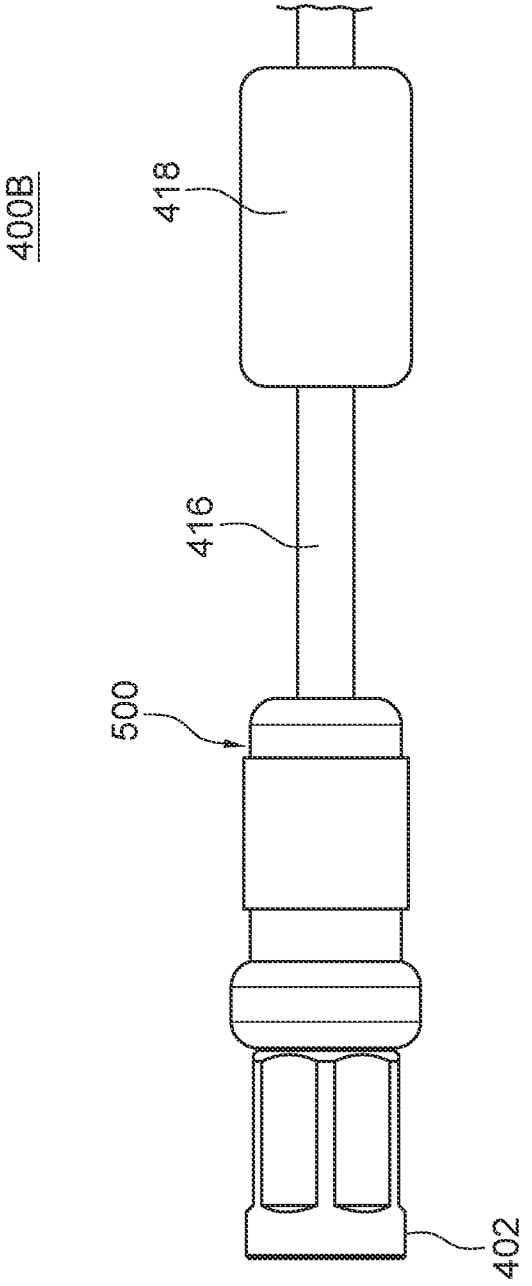
FIG. 5 shows a second assembly step for assembling a multi-member cable strain relief apparatus around a connector-terminated cable, in accordance with some exemplary embodiments of the present disclosure.

Referring to FIGS. 1A, 1B, 2A, 2B, and 3, several views are shown of an exemplary cable strain relief member 100, which may form part of an exemplary, multi-member cable strain relief apparatus 500 as shown in FIG. 5, in accordance with some embodiments of the present disclosure. The member 100 is an elongated and generally curved article having multiple sections 114, 120, 124 (three shown for illustration purposes only) sized and shaped to accommodate connector portions and cable portions of different diameters or widths. Where the connector and cable to be snugly surrounded and supported by the strain relief apparatus 500 have longitudinal symmetry, the member 100 may likewise be substantially symmetric about a central, longitudinal axis 102. Otherwise, each section 114, 120, 124 of the member 100 may be sized and shaped to partially surround a portion of a cable connector or a portion of a cable for which strain relief is to be provided. The longitudinal axis 102 shown in FIGS. 1A and 1B is for reference purposes only and does not form a physical part of the member 100 or structure of any kind. As used herein and in the appended claims, the term "curved" includes semi or otherwise partially cylindrical, tubular, arched, spherical, U-shaped in any fashion (including, but not limited to, segmented or boxed), conical, or the like.

The member 100 has a first end 104 and a second end 106 that is opposite the first end 104 in the elongated, longitudinal, or lengthwise direction of the member 100. The member 100 includes a wall 112 that defines a channel 108 from the first longitudinal end 104 to the second longitudinal end 106. The channel 108 is generally curved in a widthwise direction perpendicular or orthogonal to the axis 102 and varies in radial distance from a center, longitudinal axis 201 of the channel 108 to the inside surface 110 of the wall 112 along the channel 108. The wall 112 includes opposing ends or faces 113, 115 on opposite widthwise sides of the member 100. The ends or faces 113, 115 are the flat, coplanar tops of the wall 112 on each widthwise side of the member 100.

Figure 2A:
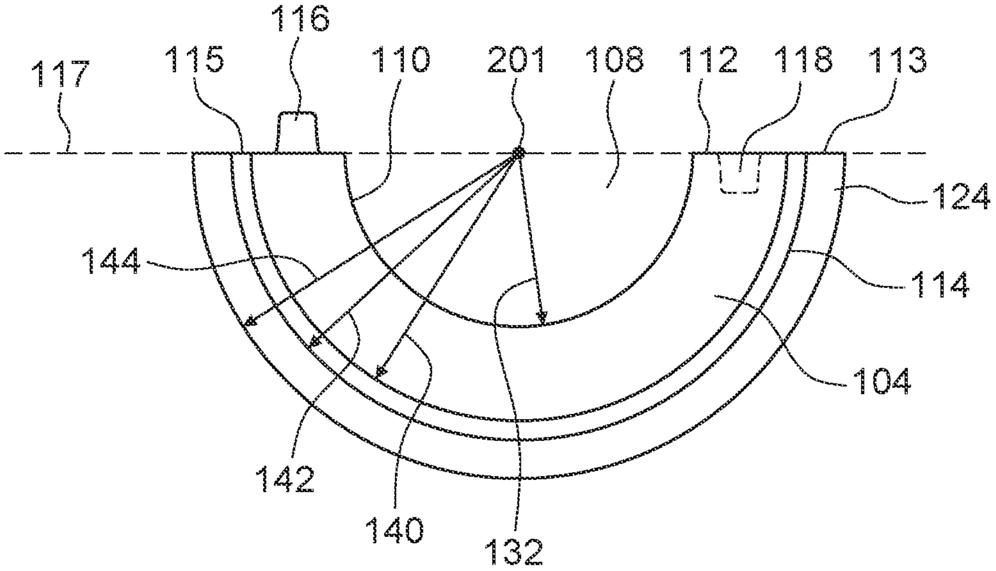
FIG. 2A is a right end elevational view of the exemplary cable strain relief member of FIG. 1B.
Figure 2B:
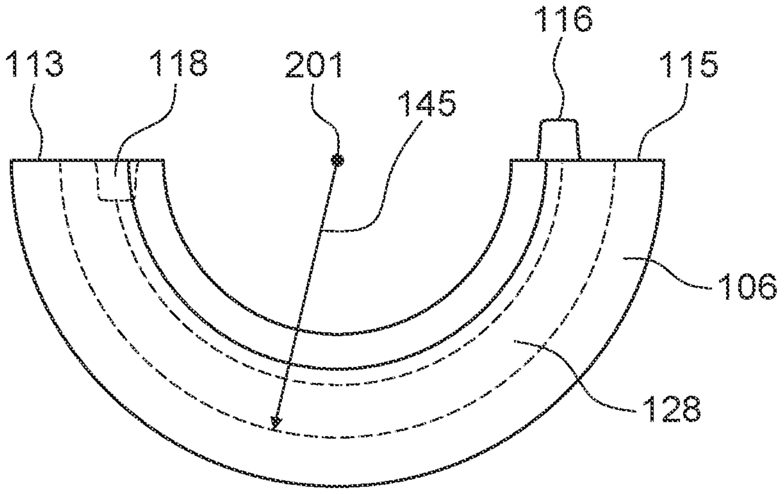
FIG. 2B is a left end elevational view of the exemplary cable strain relief member of FIG. 1B.
Figure 3:
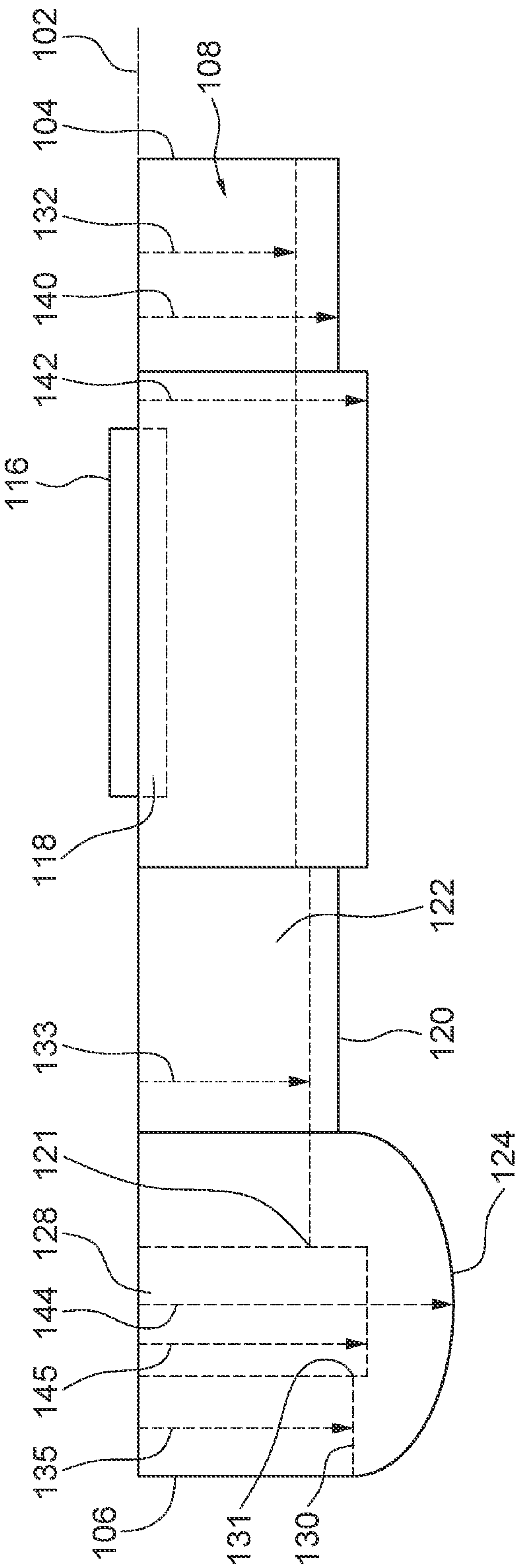
FIG. 3 is a side elevational view of the exemplary cable strain relief member of FIG. 1B.

The radius of the inside surface of the wall 112 can vary from section to section of the member 100 along the length of the member 100. As shown in FIG. 2A, the member 100 is curved when viewed from an end view and, in one exemplary embodiment, has a semicircular appearance from an end view. A second member can be placed, inverted, over the member 100 shown, wherein the channels 108 of each of the members 100 would be contiguous and create a fully enclosed bore along the channel 108. The channel 108 is configured to accommodate a cable and a portion of a coaxial cable connector to which the cable is connected.

Along a central longitudinal axis 201 of the joined or mated members 100, 401, the distance from the axis to the outside of the wall 112, in a direction perpendicular to the axis 201, can vary along the axis 201. For example, in a first or cable section 114, between the first end 104 and the entrance to a second or intermediate section 120, there can be a first distance 140 (e.g., radial distance) from the axis 201 to the outside surface of the wall 112. Along the cable section 114, there can be a second distance 142 from the axis 201 to the outside surface of the wall 112. Along an intermediate section 120 the distance to the outside surface of the wall 112 can be equal to the first distance 140. Between the intermediate section 120 and the second end is a terminal section 124 that is configured to enclose a radial shoulder at an end of a coaxial cable connector, as will be shown. Along the terminal section 124 the outside surface of the wall 112 follows a semicircular profile along the axis 201 and can extend outward to a maximum distance 144 from the axis 201 at about the middle of the terminal section 124 between the second end 106 and the intermediate section 120 along the axis 201. It will be appreciated by those skilled in the art that the distance to the outside of the wall 112 can be a radius, if the outside surface of the wall 112 has a semicircular cross section relative to the axis 201. However, the outside surface of the wall 112 can have other shapes that are equivalent. For example, the outside of the wall 112 can have a square, rectangular, smooth, or segmented cross section, in a direction perpendicular to the axis 201.

Along the member 100 is a channel 108 that is configured to accommodate a coaxial cable along a portion thereof, and an end of a coaxial cable connector where the coaxial cable connector receives the end of the coaxial cable. The channel 108 is defined by the inside surface 110 of the wall 112. The channel 108 extends completely along the length of the member 100 from the first end 104 to the second end 106. In the first section 114 of the member 100, the width of the channel 108 is a first distance 132. The first distance 132 may be selected to be about the same size as the diameter of the coaxial cable that will reside in this section 114 of the channel 108. The width of the channel 108 may be enlarged in the intermediate section 120 of the member 100 to form an enlarged portion 122 and have a second distance 134 that is greater than the first distance 132. The second distance 134 may be selected to accommodate a section of the coaxial cable where the coaxial cable is soldered or otherwise connected to the coaxial cable connector. In the terminal section 124, the inside surface 110 of the wall 112 may form a trough 128 to capture a shoulder of the coaxial cable connector. The trough 128 may have a radial distance 145 from the bottom of the trough 128 to the central longitudinal axis 201 that is substantially consistent along the trough 128. The width of the trough 128 may be greater than the width of the enlarged portion 122 of the channel 108, where the diameter of the connector collar is greater than the diameter of the enlarged portion 122 of the channel 108. The trough 128 is bounded by sides 129, 131 at the inner surface 110 of the wall 112. Side 129 is where the trough 128 meets the enlarged portion 122 of the channel 108, and side 131 is where the trough 128 meets interior portion 130. The inside surface 110 of the wall 112 in the trough 128 is at a distance 144 from the axis 201 which may be half the distance 136 (e.g., diameter) across the trough 128 at the faces 113, 115. And between the trough 128 at side 131 and the second end 106 the inner surface 110 of the wall 112 is at a distance from the axis 201 to the inner surface 110 of the wall 112 that is less than that of the trough 128 but can be more than that of the intermediate section to encircle a shank portion of the coaxial connector.

Along the top of the wall 112, on either side of the axis 201, are interfacing features, such as a protrusion (e.g., a tongue 116) that extends upward from the top of the wall 112 at face 115, perpendicular to the plane 117 of the face 115, and a protrusion receptacle (e.g., a groove 118) formed into the top of the wall 112 at face 113, opposite the tongue 116. The groove 118 is formed to have a size that is substantially a negative of the tongue 116. Thus, when two identical members are arranged around a coaxial cable and connector, the faces 113, 115 mate with the opposite face of the other member. That is face 113 of a first member mates with a face 115 of a second member, and vice versa. Since the faces 113, 115 are coplanar, the interface between two members is also in the plane 117 of the faces 113, 115. The tongue 116 of a first member fits into the groove 118 of the second member, and the groove 118 of the first member receives the tongue 116 of the second member. The interfacing of tongue 116 into the groove 118 of another member prevents the two members from moving relative to each other either along the axis 201 or in any direction in the plane 117 defined by the top of the wall 112 on either side of the axis 201, and which also passes through the axis 201. The interfacing features can take other shapes than those shown here, and in general there is a protrusion of some sort extending from the top of the wall on one side of the member 100, and a negative recess into the top of the wall on the other side, opposite the axis 201. The protrusion and the recess are symmetric about the axis so that members can be assembled together such that the protrusion of one member nests into the recess of the other member, and vice versa.

Figure 4:
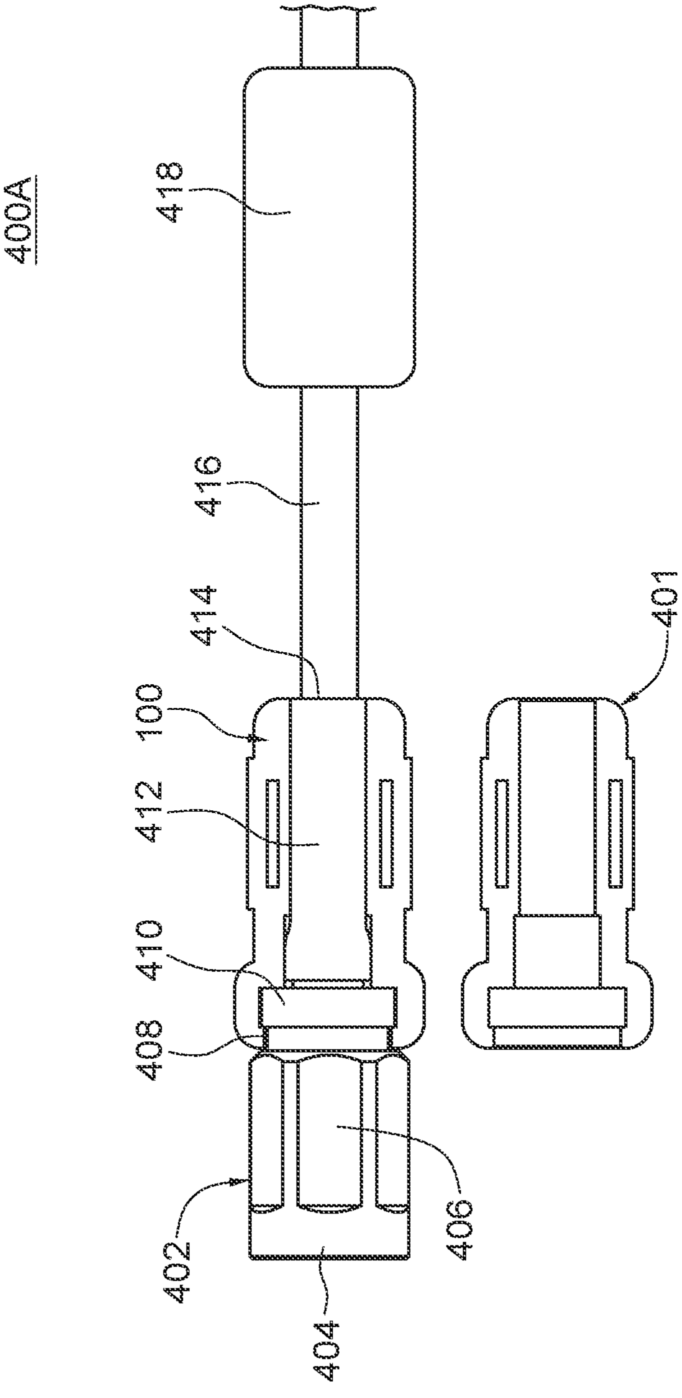
FIG. 4 illustrates a first assembly step for assembling a multi-member cable strain relief apparatus around a connector-terminated cable, in accordance with some exemplary embodiments of the present disclosure.
Figure 6:
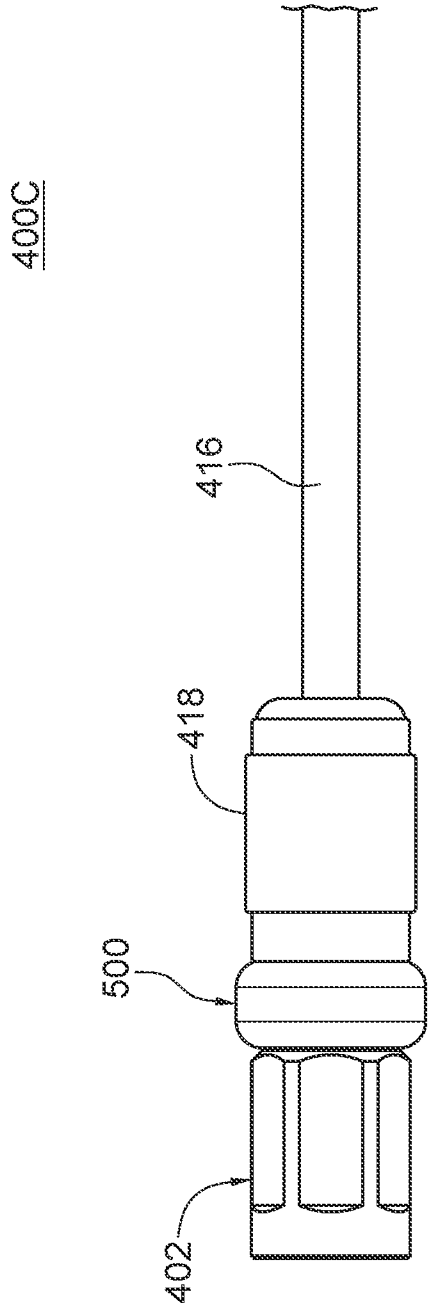
FIG. 6 shows an assembled cable strain relief apparatus with an optional supportive sheath, in accordance with some exemplary embodiments of the present disclosure.

Assembly of the cable connector apparatus is illustrated in FIGS. 4-6, in sequential order. FIG. 4 shows a first assembly step 400A for assembling a cable strain relief apparatus, FIG. 5 shows a second assembly step 400B, and FIG. 6 shows a cable assembly 400C containing the assembled cable strain relief apparatus 500. In FIG. 4, there is shown a coaxial cable connector 402 that terminates a coaxial cable 416. The coaxial cable 416 is connected to the connector 402 such that the center conductor (not shown) of the coaxial cable 416 is crimped onto or soldered to the center conductor (not shown) of the connector 402 and an elongated collar of the connector 402 (residing under the heat shrink tubing 412 shown in FIG. 4) is crimped onto the shielding of the coaxial cable 416. The connector 402 includes an interfacing end 404 that can be connected to a corresponding connector mount. The cable connector 402 may be a male subminiature version A (SMA) coaxial radio frequency (RF) connector or any other connector appropriate for the particular use application. A rotatable body of the connector 402 can have flat sections 406 to facilitate connecting and disconnecting the connector 402 to and from a mating connector of an electronic or RF module or another cable. The end where the cable is coupled to the connector 402 forms a collar or shoulder 410 that extends outward radially relative to a shank portion 408, forming an annular structure around the axis of connector 402 and which extends outward by a distance greater than either distance 133 or 135, but less than distance 145 so that the shoulder 410 can be captured in the trough 128 of the first member 401 and the second member 100. Furthermore, the length of the trough 128 in a direction along the axis 201, should be just slightly larger than that of the shoulder 410 so that that the shoulder 410 is held snugly in the troughs of the two members 100, 401.

A binder may be optionally used to hold the joined strain relief members 100, 401 together. For example, a length of heat shrink tubing 412 may be placed over the cable 416 prior to assembly of the cable strain relief apparatus and shrunk to hold one or more sections 114, 120, 124 of the joined or mated members 100, 401 of the apparatus together. The heat shrink tubing 412 can extend over a portion of the cable 416 to also bind the mated members 100, 401 of the apparatus to the cable 416. First cable strain relief member 401 and second cable strain relief member 100 are shown, ready to be assembled together about the connector 402 and cable 416. Member 100 is shown placed on the connector 402 and cable 416 such that the shoulder 410 sits in the trough 128 of member 100. The cable 416 then runs from the connector 402 at the shoulder 410 along the channel 108 of the member 100, the cable 416 including the shrink wrap segment 412 around the cable 416. The interior portion 130 between the trough 128 and the second end 106 of the member 100 has a radial distance 135 from the axis 201 and will be against the shank 408 of the connector 402. Thus, the shoulder 410 is captured in the trough 128. Member 401 can then be inverted and placed over member 100 such that the tongue 116 of member 401 nests into groove 118 of member 100, and the tongue 116 of member 100 nests into the groove 118 of member 401, as shown in FIG. 5, to form one exemplary embodiment of a cable strain relief apparatus 500. The top of the wall 112, when the interfacing members 100, 401 are interfaced or mated together, faces the top of the wall of the other interface member. Thus, the top of the wall 112 can be considered a face or end and placing these faces or ends of the members 100, 401 together results in an interface.

In FIG. 6, the previously unshrunk section of heat shrink tubing 418 is slid over the two mated members 100, 401 and then shrunk over them by application of hot air. The heat shrink tubing section 418 can have a length, after being shrunk, that is greater than the length of the interface section 418, and cover the two members 100, 401 of the cable strain relief apparatus 500 from the first end 104 to the terminal section 124, including the intermediate section 120. Because the interface section 114 extends outward farther than the section between the interface section 114 and the first end 104, and the intermediate section 120, there are shoulders created between these sections that, when the heat shrink tubing 418 is then shrunk over, help to hold the shrunken heat shrink tubing 418 in place. Likewise, the shrunken heat shrink tubing 418 holds the two members 100, 401 together around the cable 416 and connector 402. As a result, the cable 416 is held in place relative to the connector 402. The heat shrink tubing 418 acts as a binder to bind the mated members 100, 401 together. Other types of binders can be used, including, for example, tape, cable ties, and so on. The heat shrink tubing 418 can have a length that, after being shrunk fully covers all by the terminal section 124 of the mated members 100, 401. The members 100, 401 may be electrically non-conductive and rigid, and can be made of a polymeric material. Where the cable 416 is an antenna cable, the position of the cable can affect radio frequency operation of the device in which it is used. Thus, the impedance matching of radio signals transmitted through the cable 416 from a radio unit can be affected by bends/kinks in the cable 416 and produce intermodulation products. The cable strain relief apparatus disclosed herein ensures the cable 416 maintains a desired shape relative to the connector 402 and prevents the cable from being inadvertently bent out of place when installed in a radio device.

Figure 7:
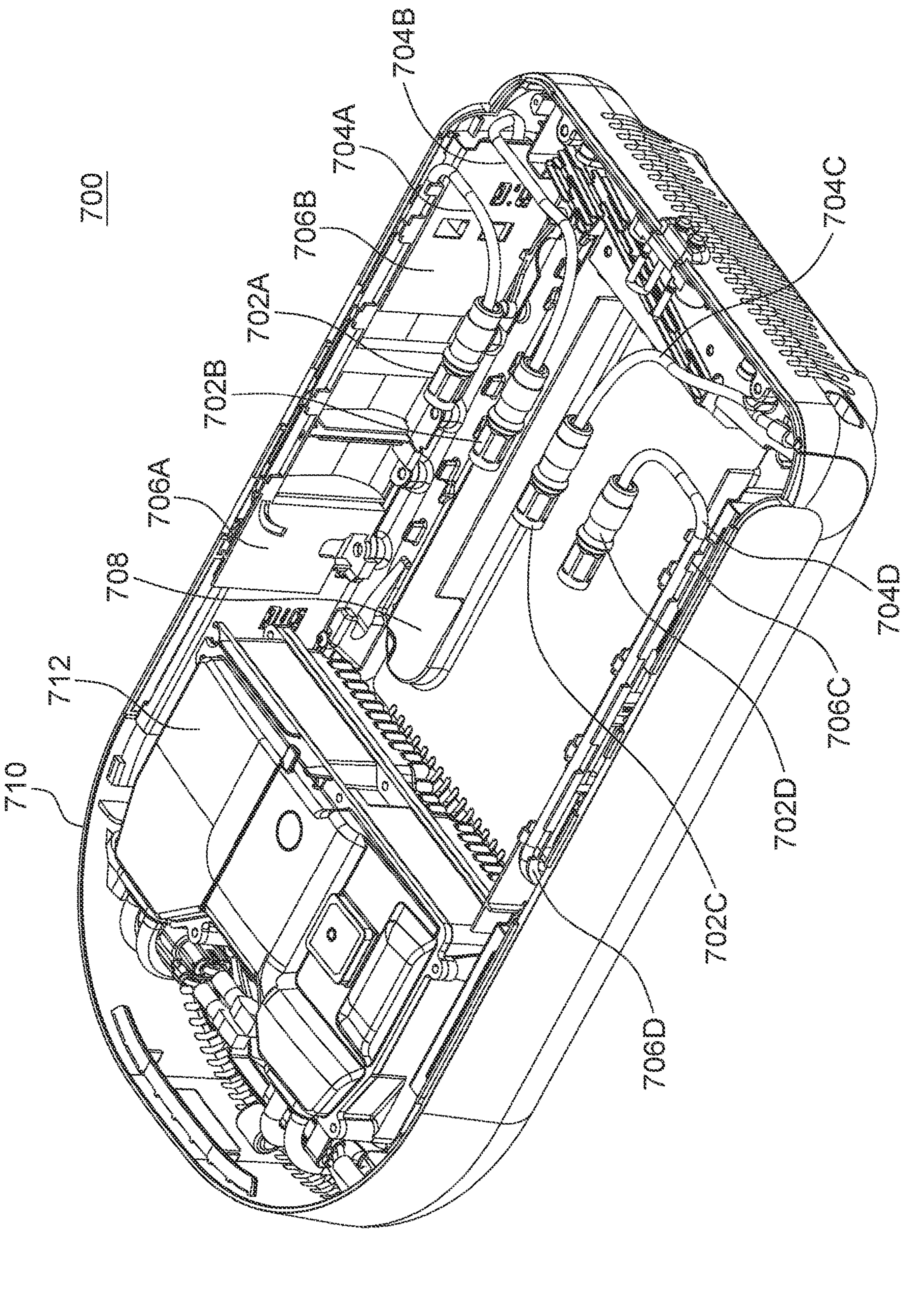
FIG. 7 shows a perspective view of an exemplary small cell access device in which multiple cable strain relief apparatuses are used on connector-terminated antenna cables where the connecters of the cables are arranged for securing to mating connectors of one or more radio units or modules (not shown), in accordance with some exemplary embodiments of the present disclosure.

FIG. 7 shows a perspective view of an exemplary small cell access device 700 in which a plurality of cable connectors 702A-D are used on antenna cables 704A-D, respectively, which join to a radio unit (not shown) that gets mounted in space 708, in accordance with some embodiments of the present disclosure. Each of the connectors 702A-D include a cable strain relief apparatus as shown, for example, in FIG. 6, which includes a plurality of interfacing members (e.g., 100, 401) that are held together by a section of shrunken heat shrink tubing (e.g., 418) or an equivalent, such as tape. Each of the cables 704A-D connect their respective connectors 702A-D to a respective antenna 706A-D. Each one of the cables 704A-D are routed along particular path and held in place by various brackets and guides to ensure that each cable 704A-D follows the particular shape for its route, and therefore results in consistent radio frequency performance from unit to unit. The routes of each cable 704A-D can also be selected to minimize interference or pickup from any of the other elements. The antennas 706A-D can be vertically oriented planar antennas for operation in the range of 24-54 GHz and are located on the sides of the housing 710 of the small cell access node device. A power and control unit 712 is housed in the housing 710 and provides power to the radio unit. Thus, some embodiments can include both a cabling system for a radio device using cables having the disclosed cable strain relief apparatus, and a radio device using the cabling system including the disclosed cable assembly.

A cable strain relief apparatus has been disclosed that includes a plurality of interfacing members that surround a coaxial cable and a portion of a coaxial connector coupled to the end of the coaxial cable. The interfacing members may be substantially identical and have interfacing features to mate and nest with the interfacing features of the interfacing member(s). The interfacing members cover the end of the cable where it connects to the connector and form an annular trough that captures an annular shoulder around the connector. A portion of heat shrink tubing, after being shrunk, can hold the interfacing members together. When so placed on a coaxial cable and connector, the cable strain relief apparatus holds the cable in place relative to the connector to prevent bending of the cable near the connector and assure that the cable will hold a particular shape within a radio device to prevent undesirable radio effects such as intermodulation products. One of the benefits of configuring the member 100 as shown is that only one component (member 401) needs to be manufactured. Two identical members can be used to create the desired strain relief apparatus. That means only one mold design is needed, only one inventory item needs to be tracked, and only one type of packaging is needed.

According to another exemplary embodiment, a single member cable strain relief apparatus 100 includes at least a first section 120, 124 sized and shaped to partially surround a portion 408, 410 of a cable connector (e.g., a coaxial cable connector 402) and a second section 114 aligned with the first section 120 along a central longitudinal axis 102, 201, wherein the second section 114 is sized and shaped to partially surround a portion (e.g., the portion under heat shrink tubing 412) of a cable (e.g., a coaxial cable 416) to which the cable connector 402 is attached. In such an embodiment, the first and second sections 114, 120 may be rigid to prevent or at least mitigate bending or pinching in the area where the connector 402 is attached (e.g., soldered, crimped, or otherwise secured) to the cable 416. The first and second sections 114, 120 may also be non-conductive to reduce cost and minimize any electrical effects of the cable strain relief apparatus 100 on the performance of a cable assembly that includes the connector 402, the cable 416, and the cable strain relief apparatus 100. The first and second sections 114, 120 may be fabricated as a single, injection molded component or may be fabricated as separate components. The cable strain relief apparatus 100 may also include an optional binder, such as tape, adhesive, or heat shrink tubing 418, sized and shaped to surround and secure the first section 120 and the second section 114 to the cable 416. In the single member embodiment, the cable strain relief apparatus 100 may exclude the protrusion 116 and the protrusion receptacle 118, thereby including flat exposed wall faces 113, 115.

According to an alternative exemplary embodiment, a cable strain relief apparatus 500 includes a pair of elongated members 100, 401. A first member 100 of the pair includes a first section 120 sized and shaped to partially surround a portion 408, 410 of a cable connector 402, a second section 114 sized and shaped to partially surround a portion (e.g., the portion under heat shrink tubing 412) of a cable 416 to which the cable connector 402 is attached, and a protrusion 116 extending from an exposed face 115 of a wall 112 of the second section 114 of the first member 100. The two sections 114, 120 of the first member 100 are aligned along a central longitudinal axis 102, 201.

The second member 401 of the pair includes a first section 120 sized and shaped to partially surround the portion 408, 410 of the cable connector 402, a second section 114 sized and shaped to partially surround the portion (e.g., the portion under heat shrink tubing 412) of the cable 416 to which the cable connector 402 is attached, and a protrusion receptacle 118 integrated into at least an exposed face 113 of a wall 112 of the second section 114 of the second member 401. When the first member 100 and the second member 401 are mated together, the first section 120 of the first member 100 and the first section 120 of the second member 401 define a first compartment sized and shaped to snugly surround the portion 408, 410 of the cable connector 402, the second section 114 of the first member 100 and the second section 114 of the second member 401 define a second compartment sized and shaped to snugly surround the portion of the cable 416 to which the cable connector 402 is attached, and the protrusion 116 of the first member 100 mates with the protrusion receptacle 118 of the second member 401.

According to another alternative embodiment, each member 100, 401 of the multi-member cable strain relief apparatus 500 may be curved and include both a protrusion 116 extending from one exposed face 115 of its wall 112 and a protrusion receptacle 118 integrated into the opposite exposed face 113 of its wall 112 such that when the two members 100, 401 are mated together, each member's protrusion 116 mates with the other member's protrusion receptacle 118. According to one exemplary embodiment, the two members 100, 401 of the apparatus 500 may be identical or substantially identical such that when one member 100, 401 is placed atop the other 100, 401 with the cable connector portion 408, 410 and the cable portion in between, the two members 100, 401 mate together and surround the portion 408, 410 of the cable connector 402 and the portion of the cable 416 for which the members 100, 401 were sized and shaped (e.g., configured). According to another exemplary embodiment, each member 100, 401 of the multi-member cable strain relief apparatus 500 may be a single molded component.

According to a further exemplary embodiment, the wall 112 of the second section 114 of a particular member 100, 401 may be common to the member 100, 401 entirely (especially where the member 100, 401 is a single molded component) and a width 132, 134, 136 of an inside surface 110 of the wall 112 may vary between the first section 120, 124 of the member 100, 401 and the second section 114 of the member 100, 401. For example, the width or inner diameter 132, 134, 136 of the wall 112 may be greater in the first section 124, 120 (e.g., to accommodate the cable connector portion 408, 410) than it is in the second section 114 (e.g., to accommodate the cable 416).

In another exemplary embodiment, the protrusion 116 of the first member 100 of the cable strain relief apparatus 500 may be a partially cylindrical tongue. In such a case, the protrusion receptacle 118 of the second member 401 of the cable strain relief apparatus 500 may be a complementary, partially cylindrical groove.

In a further exemplary embodiment, the cable strain relief apparatus 500 may also include an optional binder sized and shaped to surround and retain the first member 100 and the second member 401 in a mated relationship when the first member 100 and the second member 401 are mated together. The binder may be or include heat shrink tubing 418 that has been shrunk around all or part of the apparatus members 100, 401. Alternatively, the binder may be or include tape (e.g., electrical tape), liquid adhesive, or a clamp. The binder may also overlap the members 100, 401 of the strain relief apparatus 500 and the cable 416 for which relief is being provided by the strain relief apparatus 500.

According to a further exemplary embodiment, a cable assembly 400C includes a cable 416, a connector 402 attached to a first portion (e.g., a terminal portion) of the cable 416, and a cable strain relief apparatus 100, 500 providing strain relief at the first portion of the cable 416. The cable strain relief apparatus may be the single member apparatus 100 or the multi-member apparatus 500 described above. The cable 416 may be a coaxial cable or other signal-carrying cable. In one exemplary embodiment, the cable strain relief apparatus 500 of the cable assembly 400C is a multi-member apparatus that includes a pair of elongated members 100, 401, which mate together to snugly surround a portion 408, 410 of the connector 402 and a second portion of the cable 416 (e.g., the portion of the cable 416 under heat shrink tubing 412). The second portion of the cable 416 may be adjacent or proximate to the first portion of the cable 416.

In this exemplary embodiment, the first member 100 may include a first section 120, 124 sized and shaped to receive and partially surround the portion 408, 410 of the connector 402, a second section 114 sized and shaped to receive and partially surround the second portion of the cable 416, and a protrusion 116 extending from an exposed face 115 of a wall 112 of the second section 114 of the first member 100. The second member 401 may include a first section 120, 124 sized and shaped to receive and partially surround the portion 408, 410 of the connector 402, a second section 114 sized and shaped to receive and partially surround the second portion of the cable 416, and a protrusion receptacle 118 integrated into an exposed face 113 of a wall 112 of the second section 114 of the second member 401. In this case, the protrusion 116 of the first member 100 mates with the protrusion receptacle 118 of the second member 401, the first section 120, 124 of the first member 100 and the first section 120, 124 of the second member 401 snugly surround the portion 408, 410 of the connector 402, and the second section 114 of the first member 100 and the second section 114 of the second member 401 snugly surround the second portion of the cable 416. In one exemplary embodiment, the protrusion 116 of the first member 100 of the cable strain relief apparatus 500 may be a partially cylindrical tongue. In such a case, the protrusion receptacle 118 of the second member 401 of the cable strain relief apparatus 500 may be a complementary, partially cylindrical groove.

In various alternative embodiments of the cable assembly 400C, the members 100, 401 of the cable strain relief apparatus 500 may be curved and include both a protrusion 116 extending from one exposed face 115 of its wall 112 and a protrusion receptacle 118 integrated into the opposite exposed face 113 of its wall 112 such that when the two members 100, 401 are mated together, each member's protrusion 116 mates with the other member's protrusion receptacle 118. According to one exemplary embodiment, the two members 100, 401 of the cable strain relief apparatus 500 may be identical or substantially identical such that when one member 100, 401 is placed atop the other 100, 401 with the connector portion 408, 410 and the cable portion in between, the two members 100, 401 mate together and surround the portion 408, 410 of the connector 402 and the portion of the cable 416 for which the members 100, 401 were sized and shaped (e.g., configured).

In a further exemplary embodiment, the cable assembly 400C may also include an optional binder sized and shaped to surround and retain the first member 100 and the second member 401 of the cable strain relief apparatus 500 in a mated relationship. The binder may be or include, for example, heat shrunk tubing 418, tape, adhesive, or a clamp.

The claims appended hereto are meant to cover all modifications and changes within the scope and spirit of the present disclosure.

What is claimed is:

1. An apparatus that provides strain relief for a cable that has a connector attached thereto, the connector including a shoulder portion and a rotatable body, the apparatus comprising:

a rigid terminal section having a first diameter and being sized and shaped to partially surround the shoulder portion of the connector; and a rigid cable section aligned with the terminal section along a central longitudinal axis, the cable section having a second diameter and being sized and shaped to partially surround a portion of the cable, wherein the second diameter is less than the first diameter.

2. The apparatus of claim 1, further comprising:

a binder sized and shaped to surround and secure at least the cable section to the cable.

3. The apparatus of claim 2, wherein the binder is heat shrink tubing.

4. The apparatus of claim 1, wherein the terminal section and the cable section are non-conductive.

5. An apparatus that provides strain relief for a cable that has a connector attached thereto, the connector including a shoulder portion and a rotatable body, the apparatus comprising:

a first elongated member including:

a first rigid terminal section having a first diameter and being sized and shaped to partially surround the shoulder portion of the connector;

a first rigid cable section having a second diameter and being sized and shaped to partially surround a portion of the cable, the first cable section being aligned with the first terminal section along a central longitudinal axis, wherein the second diameter is less than the first diameter; and a protrusion extending from an exposed face of a wall of the first cable section; and a second elongated member including:

a second rigid terminal section sized and shaped to partially surround the shoulder portion of the connector;

a second rigid cable section sized and shaped to partially surround the portion of the cable; and a protrusion receptacle integrated into at least an exposed face of a wall of the second cable section;

wherein when the first member and the second member are mated together, the first terminal section and the second terminal section define a first compartment sized and shaped to snugly surround the shoulder portion of the connector, the first cable section and the second cable section define a second compartment sized and shaped to snugly surround the portion of the cable, and the protrusion mates with the protrusion receptacle.

6. The apparatus of claim 5, wherein the second member is curved and further includes a protrusion extending from a second exposed face of the wall of the second cable section.

7. The apparatus of claim 6, wherein the first member is curved and further includes a protrusion receptacle integrated into a second exposed face of the wall of the first cable section, and wherein when the first member and the second member are mated together, the protrusion of the second member mates with the protrusion receptacle of the first member.

8. The apparatus of claim 5, wherein the first member and the second member are substantially identical.

9. The apparatus of claim 5, further comprising:

a binder sized and shaped to surround and retain the first member and the second member in a mated relationship.

10. The apparatus of claim 9, wherein the binder includes heat shrink tubing.

11. The apparatus of claim 5, wherein the cable is a coaxial cable.

12. The apparatus of claim 5, wherein each of the first member and the second member is a single molded component.

13. The apparatus of claim 5, wherein the wall of the first cable section is common to the first member entirely and wherein a width of an inside surface of the wall varies between the first terminal section and the first cable section.

14. A cable assembly comprising:

a cable;

a connector attached to a terminal portion of the cable, the connector including a shoulder portion and a rotatable body; and a cable apparatus providing strain relief at the terminal portion of the cable, the cable apparatus including:

a first elongated member that includes:

a first rigid terminal section having a first diameter and being sized and shaped to receive and partially surround the shoulder portion of the connector;

a first rigid cable section having a second diameter and being sized and shaped to receive and partially surround a portion of the cable, the second diameter being less than the first diameter; and a protrusion extending from an exposed face of a wall of the first cable section; and a second elongated member mated with the first member, the second member including:

a second rigid terminal section sized and shaped to receive and partially surround the shoulder portion of the connector;

a second rigid cable section sized and shaped to receive and partially surround the portion of the cable; and a protrusion receptacle integrated into an exposed face of a wall of the second cable section;

wherein the protrusion of the first member mates with the protrusion receptacle of the second member, the first terminal section and the second terminal section snugly surround the shoulder portion of the connector, and the first cable section and the second cable section snugly surround the portion of the cable.

15. The cable assembly of claim 14, wherein the second member of the cable apparatus is curved and further includes a protrusion extending from a second exposed face of the wall of the second cable section.

16. The cable assembly of claim 15, wherein the first member of the cable apparatus is curved and further includes a protrusion receptacle integrated into a second exposed face of the wall of the first cable section, and wherein the protrusion of the second member mates with the protrusion receptacle of the first member.

17. The cable assembly of claim 14, wherein the first member and the second member are substantially identical.

18. The cable assembly of claim 14, further comprising:

a binder sized and shaped to surround and retain the first member and the second member of the cable apparatus in a mated relationship.

19. The cable assembly of claim 18, wherein the binder includes heat shrunk tubing.

20. The cable assembly of claim 14, wherein the protrusion of the first member of the cable apparatus is a partially cylindrical tongue, and wherein the protrusion receptacle of the second member of the cable apparatus is a complementary, partially cylindrical groove.

* * * * *